United States Patent
Tepus

(10) Patent No.: US 8,533,544 B2
(45) Date of Patent: Sep. 10, 2013

(54) SYSTEM FOR TREE SEQUENCE TESTING OF A DEVICE AND METHOD FOR TREE SEQUENCE TESTING OF A DEVICE IN A TEST FRAMEWORK ARCHITECTURE

(75) Inventor: Cristian Tepus, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 6 days.

(21) Appl. No.: 13/257,334

(22) PCT Filed: Mar. 31, 2009

(86) PCT No.: PCT/IB2009/051353
§ 371 (c)(1),
(2), (4) Date: Sep. 19, 2011

(87) PCT Pub. No.: WO2010/112974
PCT Pub. Date: Oct. 7, 2010

(65) Prior Publication Data
US 2012/0017128 A1    Jan. 19, 2012

(51) Int. Cl.
*G01R 31/28* (2006.01)
(52) U.S. Cl.
USPC .............................. 714/724; 714/25
(58) Field of Classification Search
USPC .................... 701/29.1; 702/108; 714/30, 32, 714/718, 720, 724, 25
See application file for complete search history.

(56) References Cited

U.S. PATENT DOCUMENTS

| | | | |
|---|---|---|---|
| 5,421,004 A | 5/1995 | Carpenter et al. | |
| 5,630,051 A * | 5/1997 | Sun et al. | 714/32 |
| 5,703,885 A * | 12/1997 | Sun et al. | 714/738 |
| 5,740,357 A | 4/1998 | Gardiner et al. | |
| 6,128,759 A | 10/2000 | Hansen | |
| 6,618,851 B1 | 9/2003 | Zundel et al. | |
| 6,868,508 B2 | 3/2005 | Grey | |
| 7,142,960 B2 * | 11/2006 | Grier et al. | 701/29.1 |
| 7,158,906 B2 * | 1/2007 | Maruno | 702/108 |
| 8,185,782 B2 * | 5/2012 | Luo | 714/30 |
| 2002/0178416 A1 | 11/2002 | Chen et al. | |
| 2005/0114839 A1 | 5/2005 | Blumenthal et al. | |
| 2008/0127009 A1 | 5/2008 | Veneris et al. | |

OTHER PUBLICATIONS

International Search Report and Written Opinion correlating to PCT/IB2009/051353 dated May 2, 2011.

* cited by examiner

*Primary Examiner* — David Ton

(57) ABSTRACT

A system comprises a test framework architecture for tree sequence testing of a device, comprising a plurality of hierarchical layers at least comprising an upmost layer and a lowest layer, each layer of the plurality of hierarchical layers comprising at least one of a plurality of test sequences, each test sequence comprising a plurality of test steps, each test step comprising a current layer information; a test action information for carrying out a test action on the device; and a recovery information for carrying out a recovery action on reception of a recovery call from a next lower layer.

17 Claims, 4 Drawing Sheets

SYSTEM FOR TREE SEQUENCE TESTING OF A DEVICE AND METHOD FOR TREE SEQUENCE TESTING OF A DEVICE IN A TEST FRAMEWORK ARCHITECTURE

FIELD OF THE INVENTION

This invention in general relates to test frameworks and more specifically to a system for tree sequence testing of a device and a method for tree sequence testing in a test framework architecture.

BACKGROUND OF THE INVENTION

Users of software and hardware devices demand high reliability and stability against device errors and failure. For example, integrity of data of a data processing device can be compromised when a device failure occurs. A test framework for a device can serve to detect errors, for example during development, and validate and verify quality attributes of the device. A test framework may for example be implemented on a computer system and may be used for facilitating the development, execution and documentation of a device test. It may for example comprise an integrated development environment (IDE) or integrated debugging environment that provides comprehensive facilities to computer programmers for software development.

A device test using a test framework can be carried out employing a test suite. For example, in software development, a test suite is a collection of test cases that are intended to be used to test a software program or software device to show that it has some specified set of behaviors. A test suite can contain detailed instructions or goals for a collection of test cases and information on the system configuration to be used during testing. A group of test cases may also contain prerequisite states or steps, and descriptions of the following tests.

A device to be tested may often be logically or physically divided into subcomponents that can be tested hierarchically. The execution of a test case is usually organized in a sequence of test execution steps. Typically, an error is blocking the next test execution steps, limiting automatic test coverage of the device. After eliminating the error, the test may be started again. However, in large test suites, for example comprising interconnected test cases, error propagation can occur, requiring time-consuming manual investigation of errors.

SUMMARY OF THE INVENTION

The present invention provides a system for tree sequence testing of a device and a method for tree sequence testing of a device in a test framework architecture as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
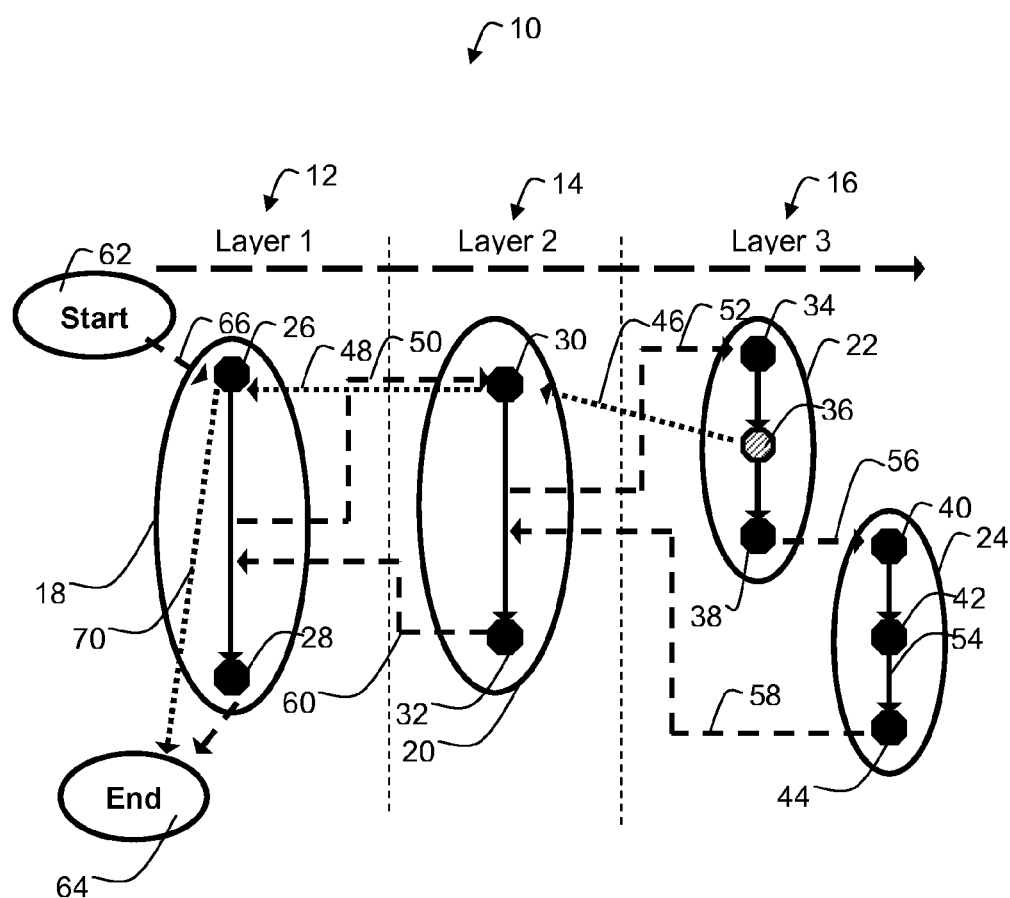
FIG. 1 shows a schematic diagram of a first example of an embodiment of a system comprising a test framework architecture for tree sequence testing of a device.

Referring to FIG. 1, a diagram of a first example of an embodiment of a system comprising a test framework architecture for tree sequence testing of a device is shown. In FIG. 1, a core part of the system 10 comprising the test framework architecture is illustrated implementing a test sequence tree. The test framework architecture for tree sequence testing of a device comprises a plurality of hierarchical layers 12, 14, 16 at least comprising an upmost layer and a lowest layer. Each layer of the plurality of hierarchical layers comprises at least one of a plurality of test sequences 18, 20, 22, 24. Each test sequence comprises a plurality of test steps 26, 28, 30, 32, 34, 36, 38, 40, 42, 44. Each test step comprises a current layer information, a test action information for carrying out a test action on the device, and a recovery information for carrying out a recovery action on reception of a recovery call 46, 48 from a next lower layer.

This may for example help increasing a level of automation of a testing process. And it may help reducing time for test engineers required for investigating errors in large test suites and may provide an easy way of manual error investigation in the case of error propagation across a test suite.

A device may be a software device, such as for example a computer program, or a hardware device, such as for example an electronic circuit, a processor etc. And the device may comprise software and hardware components, for example a data processing unit.

A test framework architecture may comprise a complete test framework or an additional component to be added to an existing test framework, for example comprising a integrated development environment.

A test step may be an entity capable of execution of its associated test action or recovery action.

As illustrated in FIG. 1, the system comprising a test framework architecture for tree sequence testing of a device may subdivide a test case in a plurality of test steps 26-44 grouped in test sequences 18, 20, 22, 24 hierarchically organized in layers 12, 14, 16. And it may comprise a start state 62 and an end state 64.

The upmost layer may be the layer closest to start, for example layer 1 in the example shown in FIG. 1. The lowest layer may be the layer furthest from the upmost layer, for example layer 3 in the example shown in FIG. 1. A current layer may be the layer wherein a currently processed test step is located. A next lower layer may be the next layer directly following the current layer, a next upper layer may be the layer directly preceding the current layer. If for example layer 2 in the example shown in FIG. 1 is the current layer, layer 3 may be the next lower layer and layer 1 may be the next upper layer.

A call may be a request for execution, for example a test call 50, 52, 54, 56, 58, 60 or call for test may be a request signal for a test step receiving the request for executing its associated test action, a recovery call 46, 48 may be a request for a receiving test step for executing its associated recovery action.

A test action information may be an information associated to a test step for instructing the framework what test action to perform on the test device or device under test. A current layer information may be a layer stamp indicating the layer 12, 14, 16 the test step having the current layer information belongs to. And a recovery action information may be an information associated to a test step instructing the framework what to retry in the case of occurrence of an error, i.e. in case of failure of a test action. That is, a recovery action may be an action of a test step after test action failure for restoring a test environment or test context prior to that failure.

The recovery call 46 from the next lower layer may be generated when a test action of a test step 36 of a test sequence 22 of the next lower layer fails. For example, the failed test step 36 shown in layer 3 of FIG. 1 may cause a generation of a recovery call 46 directed to the successful test step 30 of layer 2.

And recovery calls 46, 48 may be recursively generated from each next lower level until a recovery action of a test step of a test sequence of a current layer succeeds. For the shown example, the initially current layer 2 may be regarded as the next lower layer 2 with the next iteration, generating a recovery call 48 directed to a test step 26 located in layer 1, then being regarded as the new current layer, if the recovery action associated with test step 30 of layer 2 does not succeed. Therefore, this approach may allow for a test context rollback of the test environment until a recovery succeeds or recovery ends 70.

Figure 2:
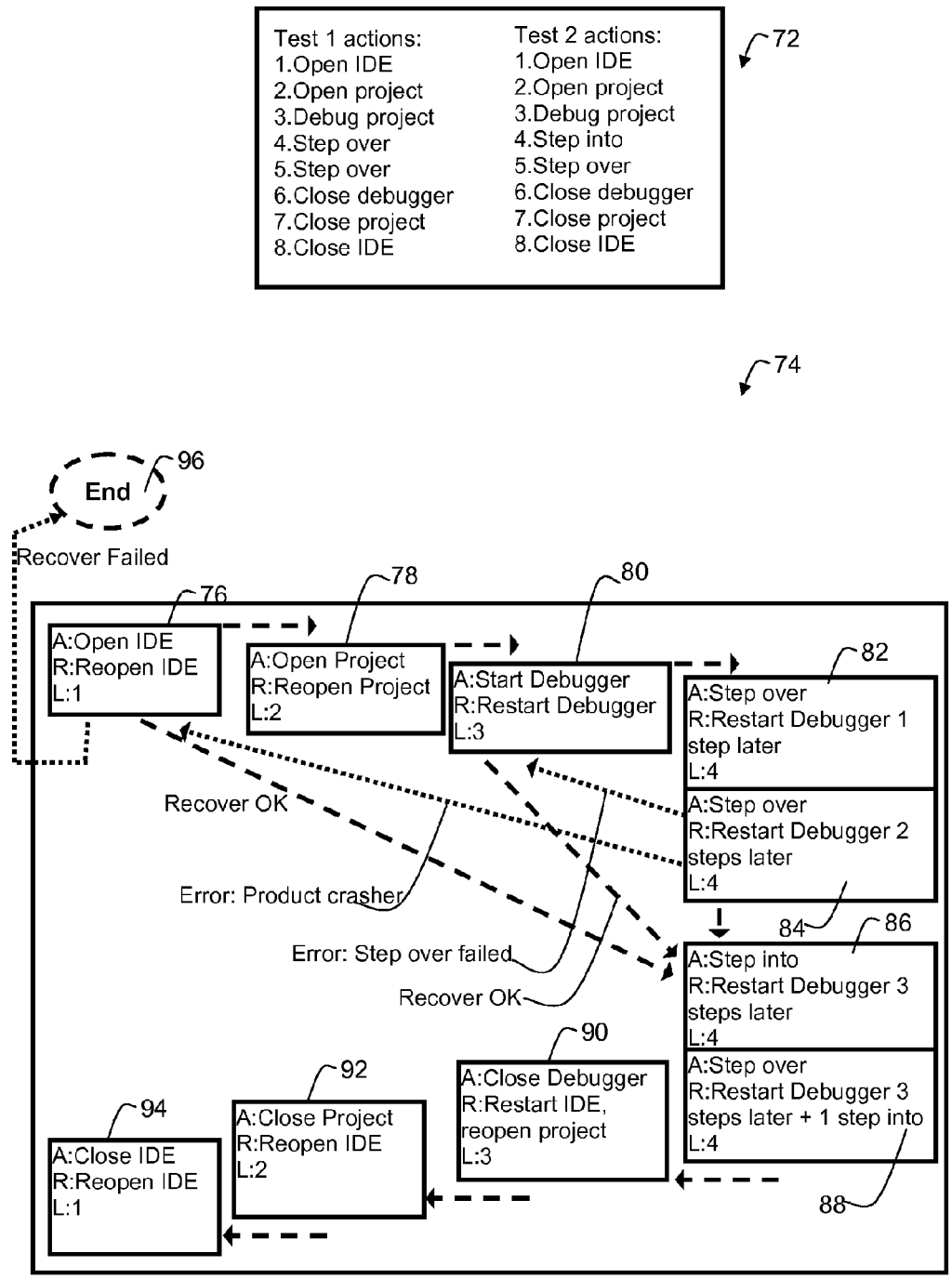
FIG. 2 shows a schematic diagram of a second example of an embodiment of a system comprising a test framework architecture for tree sequence testing of a device.

Referring now also to FIG. 2, a schematic diagram of a second example of an embodiment of a system comprising a test framework architecture for tree sequence testing of a device is shown. Further, an execution of test steps of two tests 72 is illustrated in a common, consecutive order, in comparison with the second example of an embodiment of a system 74 comprising a test framework architecture for tree sequence testing. As shown, each test step 76, 78, 80, 82, 84, 86, 88, 90, 92, 94 may comprise a test action information A, a recovery action information R and a current layer information L. If for example, test step 84, which belongs to a test 1 when being executed in a common consecutive order, fails with executing its test action "step over", a recovery call "Error: Step over failed" may be generated and send to test step 80. This may cause test step 80 to carry out its associated recovery action "Restart debugger" and allow the system to continue with test 2 test step 86 executing its test action "step into" without the need for executing test steps 76 and 78, which may be identical for both tests and may have already been successfully completed in the shown example.

Or a recovery call, for example a recovery call "Error: Product crasher" issued due to failure of test step 84, may be passed on to a next upper layer, when a test action failure classification indicates that a recovery action will not be successful for a current layer. The described error may not be solved by test step 84 recovery action "Restart Debugger". Therefore, test steps may be able to pass on the recovery call to their next upper layer until it passes. Or a failure classification unit may classify the type of error and may comprise a linkage between the types of errors and layers or test steps designated to receive a corresponding recovery call. This may avoid passing on the recovery call between consecutive layers. In the example shown in FIG. 2, the recovery call "Error: product crasher" may be passed between layers or may be directly send to test step 76 for recovery action "Reopen IDE". IDE may for example be an IDE comprised by the test framework of the system. Successful recovery action "Reopen IDE" may allow the system 74 to continue with test 2 test step 86 executing its test action "step into". However, if a recovery action in the upmost layer (layer 1 in the example shown in FIG. 2) fails, the test may end 96.

Referring back to FIG. 1, a test call or call for test 66 may initially be issued after start 62 of a test, initiating an execution of a test action of an upmost layer test step 26. Later, a test action of a current test 30 step may be carried out on reception of a test call 50 generated by a next upper layer test step 26 when a test action of the next upper layer test step 26 succeeds. If for example test step 26 of layer 1 in the example shown in FIG. 1 succeeds, test step 30 of layer 2 may receive a test call 50.

Or a test action of a current test step may be carried out on reception of a test call generated by a previous test step of the same current test sequence of the same current layer, preceding the current test step, for example test call 54 for a current test step 44 when layer 3 shown in FIG. 1 is the current layer. And since there may be more than a single test sequence in a layer, a test action of a current test step 40 may be carried out on reception of a test call 56 generated by a previous test step 38 of a different test sequence 22 of the same current layer, when the previous test step 38 of the different test sequence 22 finishes the different test sequence 22.

Or a test action of a current test case step may be carried out on reception of a test call 58, 60 generated by a next lower layer test step when a test action of the next lower layer test step succeeds and the next lower layer test step finishes a test sequence in the next lower layer, as shown for example in FIG. 1, test call 58 when layer 3 is the next lower layer and layer 2 is the current layer. The test call may for example be initiated by a next lower layer test step 44 when said test step is the last test step of the last test sequence to be finished successfully.

Therefore, the shown system comprising a test framework architecture implements the described tree sequence testing for a device. In a test mode, an independent minimal sequence of multi-layer testing may be executed by going through test steps (i.e. "going down in test sequence tree") for executing each test step action in the natural or hierarchical layer order. Generating a minimal multi-layer sequence of test steps may allow for locating and isolating a failure. And in a recovery mode, the shown system comprising a test framework architecture may be used for executing a recovery action and hierarchically going back one layer (i.e. "going up in test sequence tree") in the case of test action failure due to an error detected. "Recover" may be repeated (in depth layer order) until getting to the next multi-layer sequence to execute. In other words, "recover" from an upper layer may be called until it passes, allowing for optimized multi-layer recovery from errors.

As described, the upper layers of a minimal sequence may able to recover their working context or test environment in the case of errors in order to set it for subsequent tests, avoiding or at least reducing a possibility of blocking the next execution steps.

Therefore, the system may comprise a memory for saving a test context for at least one of said layers. A test context or working context or test environment may comprise parameters and test action and recovery results for a layer. A test framework architecture may be able to reuse existing test environments or test contexts for example in the case of errors.

And a test context may be saved and recovered, allowing for continuation of testing of previously untested or erroneous layers of test steps. And it may allow for changing test steps in an untested layer (and hence changing a test case) while reusing the saved and recovered upper layer test context. For example, a system with a test framework comprising a debugger may continue debugging of untested layers while reusing tested layer test context. Therefore, the size of a new test case may be reduced due to the possibility of reusing the existing context of already used test steps in a test sequence tree. Hence, the described system may increase automation of testing and may ease or shorten remaining manual error handling.

The system comprising the test framework architecture may enable error recovery using a tree approach and is designated to produce as much as possible recovery of test context in order to obtain a maximum execution graph (and therefore maximum test coverage) of a device with errors.

And the system comprising the test framework architecture may comprise a representation unit for managing tests and evaluating test results of at least one of the plurality of test sequences. The representation unit may comprise means for displaying a user interface for managing tests and investigating test results at least for one layer, for example the current layer, or for more than one layer or for all layers or complete test cases, providing an easy way of adding and maintaining tests and an easy way of comprehensively detecting and tracking test errors.

Figure 3:
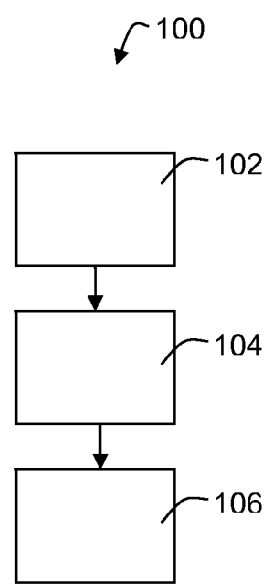
FIG. 3 shows a schematic flow diagram of a first example of an embodiment of a method for tree sequence testing of a device in a test framework architecture.

Referring now to FIG. 3, a schematic flow diagram of a first example of an embodiment of a method 100 for tree sequence testing of a device in a test framework architecture is shown. The illustrated method allows implementing the advantages and characteristics of the described system as part of a method for tree sequence testing of a device in a test framework architecture. The method for tree sequence testing of a device in a test framework architecture comprises creating 102 a plurality of hierarchical layers at least comprising an upmost layer and a lowest layer, each of the plurality of hierarchical layers comprising at least one of a plurality of test sequences, each test sequence comprising a plurality of test steps, each test step comprising a layer information; a test action information for carrying out a test action on the device, and a recovery information for carrying out a recovery action on reception of a recovery call from a next lower layer. Further, the method comprises executing 104 test actions of the plurality of test steps in hierarchical layer order; and executing 106 a recovery action of a next upper layer when a test action fails.

The testing method may terminate after failure of layer test action.

The step of executing 106 a recovery action of a next upper layer when a test action fails may comprise recursively repeating the step until the recovery action succeeds. Execution may be terminated, if none of these recovery actions succeeds.

Or the step of executing 106 a recovery action of a next upper layer when a test action fails may comprise recursively passing on the recovery call to a next upper layer, when a failure classification indicates that a recovery action will not be successful for the current layer.

Figure 4:
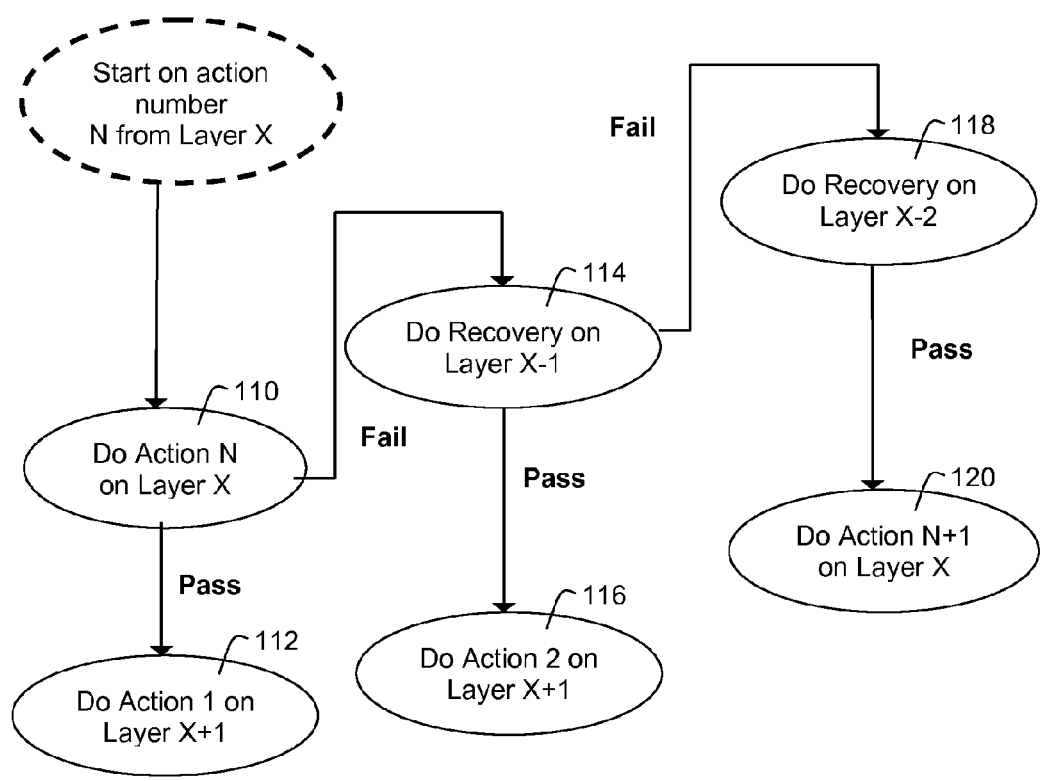
FIG. 4 shows a schematic flow diagram of a second example of an embodiment of a method for tree sequence testing of a device in a test framework architecture.

Referring now to FIG. 4, a schematic flow diagram of a second example of an embodiment of a method for tree sequence testing of a device in a test framework architecture is shown. The shown example illustrates execution 110 of a test action of a test step having a number N being located in a layer X. The test action may either succeed, i.e. pass, or fail due to an error. If test action N on layer X succeeds, testing may be continued in layer X+1 by performing 112 test action 1, i.e. the test action associated with test step 1, which may be the first test step of a test sequence located in layer X+1.

If test action N on layer X does not succeed, a recovery call may be send to the next upper layer X−1, causing execution 114 of a recovery action on layer X−1, which may either pass or fail. In case of successful recovery, the method may comprise going to layer X+1 and executing 116 test action of test step 2 on layer X+1.

In case of failed recovery, the recovery call may be passed on to layer X−2, invoking execution 118 of a recovery action on layer X−2. If for example, as shown in FIG. 4, this recovery succeeds, testing may be continued in layer X by executing 120 test action of test step N+1 on layer X.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims.

Some of the above embodiments, as applicable, may be implemented using a variety of different systems. For example, although FIG. 1 and the discussion thereof describe an exemplary system, this exemplary system is presented merely to provide a useful reference in discussing various aspects of the invention. Of course, the description has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or impose an alternate decomposition of functionality upon various logic blocks.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as a memory or other media on other computer systems. Such computer readable media may be permanently, removably or remotely coupled to system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. The programmable apparatus may for example comprise a processing device or processing unit being one or more of a group consisting of: microprocessor, central processing unit, a graphics processor, coprocessor, digital signal processor, embedded processor application specific integrated circuit (ASIC), field programmable gate array (FPGA), a device implementing a state machine, a microcontroller unit (MCU).

Furthermore, the devices may be physically distributed over a number of apparatuses, while functionally operating as a single device. In one embodiment, system 10 is a computer system such as a personal computer system. In another embodiment, system 10 may be comprised in a programmable apparatus for example being a distributed computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A system for tree sequence testing of a device, comprising:
    a current layer memory unit storing current layer information describing a current layer;
    a test action memory unit storing test action instructions executable by a test module for a test action to be carried out on said device; and
    a recovery memory unit storing recovery instructions executable by said test module, for a recovery action to be carried out on reception of a recovery call from a next lower layer with respect to the current layer, wherein
    said system is arranged to execute a multiple of test sequences in a hierarchical order defined by a test framework architecture,
    the test framework architecture comprises a plurality of hierarchical layers at least comprising an upmost layer and a lowest layer,
    each layer of said plurality of hierarchical layers comprises at least one test sequence, and each test sequence comprising a plurality of test steps comprising:
        executing on said device, in accordance with said test action instructions, said test action associated with said current layer,
        executing a recovery action in accordance with said recovery instructions on reception of a recovery call from a next lower layer with respect to the current layer, and
        transmitting a recovery call to a next upper layer with respect to the current layer when said test action fails.

2. The system as claimed in claim 1, wherein said recovery call from said next lower layer is generated when a test action of a test step of a test sequence of said next lower layer fails.

3. The system as claimed in claim 1, wherein recovery calls are recursively generated from each next lower level until a recovery action of a test step of a test sequence of a current layer succeeds.

4. The system as claimed in claim 1, wherein said recovery call is passed on to a next upper layer, when a test action failure classification indicates that a recovery action will not be successful for a current layer.

5. The system as claimed in claim 1, wherein a test action of a current test step is carried out on reception of a test call generated by a next upper layer test step when a test action of said next upper layer test step succeeds.

6. The system as claimed in claim 1, wherein a test action of a current test step is carried out on reception of a test call
    generated by one of a previous test step of the same current test sequence of the same current layer, preceding said current test step or
    a previous test step of a different test sequence of the same current layer, when said previous test step of said different test sequence finishes said different test sequence.

7. The system as claimed in claim 1, wherein a test action of a current test step is carried out on reception of a test call generated by a next lower layer test step when a test action of said next lower layer test step succeeds and said next lower layer test step finishes a test sequence in said next lower layer.

8. The system as claimed in claim 1, comprising a memory for saving a test context for at least one of said layers.

9. The system as claimed in claim 1, comprising a representation unit for managing tests and evaluating test results of at least one of said plurality of test sequences.

10. A method for tree sequence testing of a device in a test framework architecture, comprising:
    executing a plurality of test steps in a hierarchical layer order defined by a plurality of hierarchical layers at least comprising an upmost layer and a lowest layer; and
    each of said plurality of hierarchical layers comprises at least one test sequence of at least two test steps comprising:
        carrying out a test action on said device,
        transmitting a recovery call to a next upper layer when said test action fails, and
        executing a recovery action on reception of a recovery call from a next lower layer.

11. The method as claimed in claim 10, wherein said executing a recovery action by a next upper layer when a test action fails comprises recursively repeating said step until said recovery action succeeds.

12. The method as claimed in claim 10, wherein the step of executing a recovery action by a next upper layer when a test action fails comprises recursively passing on said recovery call to a next upper layer, when a failure classification indicates that a recovery action will not be successful for the current layer.

13. The method as claimed in claim 10 further comprising:
    receiving a test call generated by a test step executed by a next upper layer; and
    performing said test action on said device if the test call indicates that the test step executed by the next upper level succeeded.

14. The method as claimed in claim 10 further comprising:
    receiving a test call, wherein the test call is generated by one of
        a previous test step of a current test sequence of the same hierarchical layer, and
        a previous test step of a different test sequence of the same hierarchical layer when said previous test step finishes said different test sequence.

15. The method as claimed in claim 10 further comprising:
    receiving a test call generated by a next lower hierarchical layer test step; and
    performing said test action if the test call indicates that a test action of the next lower hierarchical layer succeeds and said next lower hierarchical layer test step finishes a test sequence in said next lower hierarchical layer.

16. The method as claimed in claim 10 further comprising storing a test context for at least one of the plurality of hierarchical layers.

17. A non-transitory computer readable storage medium storing instructions executable by a processor, the instructions configured to:
    execute a plurality of test steps in a hierarchical layer order defined by a plurality of hierarchical layers, wherein the plurality of hierarchical layers comprises at least an upmost layer and a lowest layer; and
    each of said plurality of hierarchical layers comprises instructions for at least one test sequence of at least two test steps comprising instructions configured to:
        carry out a test action on said device,
        transmit a recovery call to a next upper layer when said test action fails, and
        execute a recovery action on reception of a recovery call from a next lower layer.

* * * * *